March 24, 1959
A. K. ANANDER
2,878,717
MULTIPLE SCALE FOR A PHOTOENGRAVING CAMERA
Filed Oct. 23, 1953
2 Sheets-Sheet 1
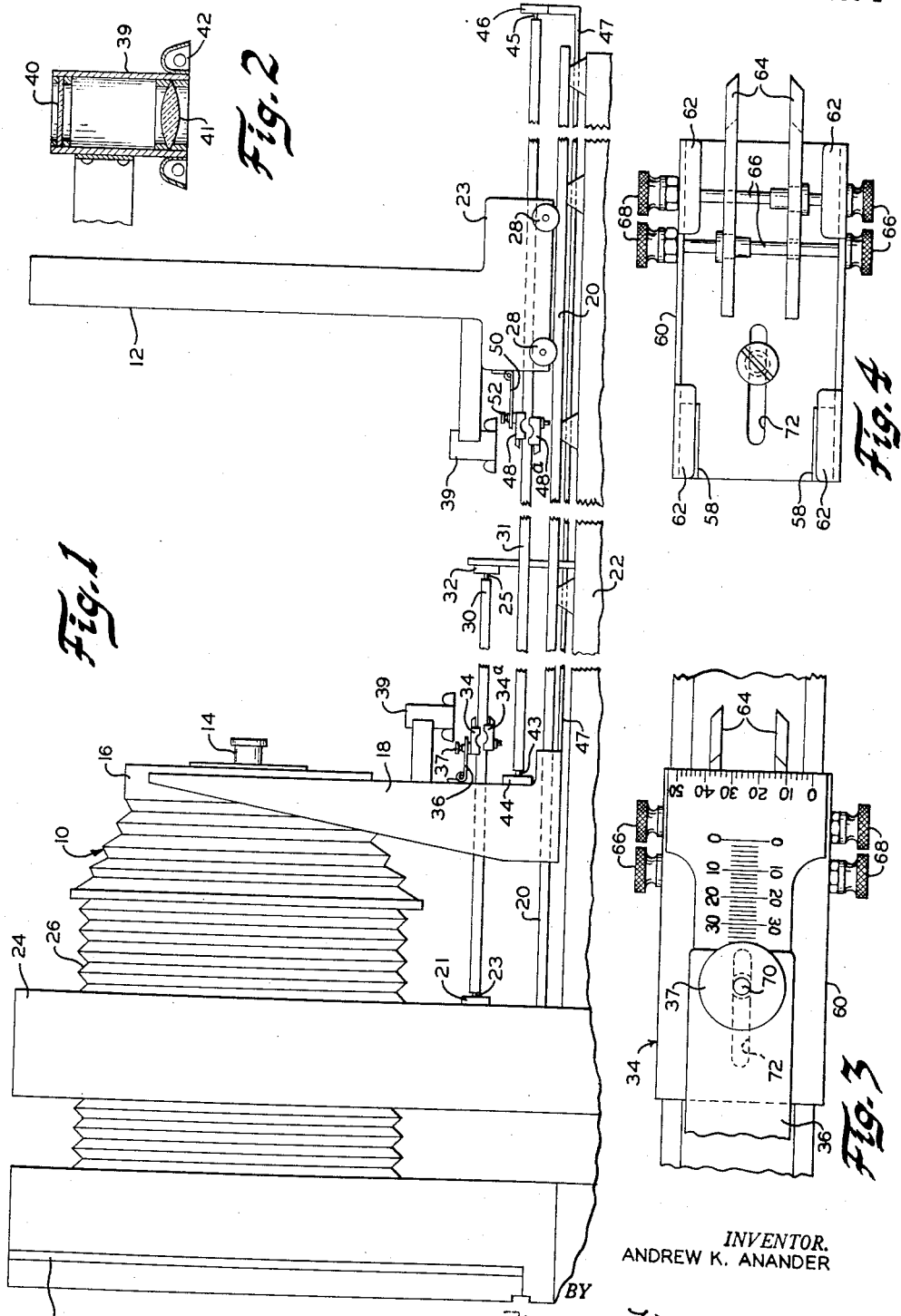
INVENTOR.
ANDREW K. ANANDER
BY Morgan, Finnegan,
   Durham & Pine
   ATTORNEYS

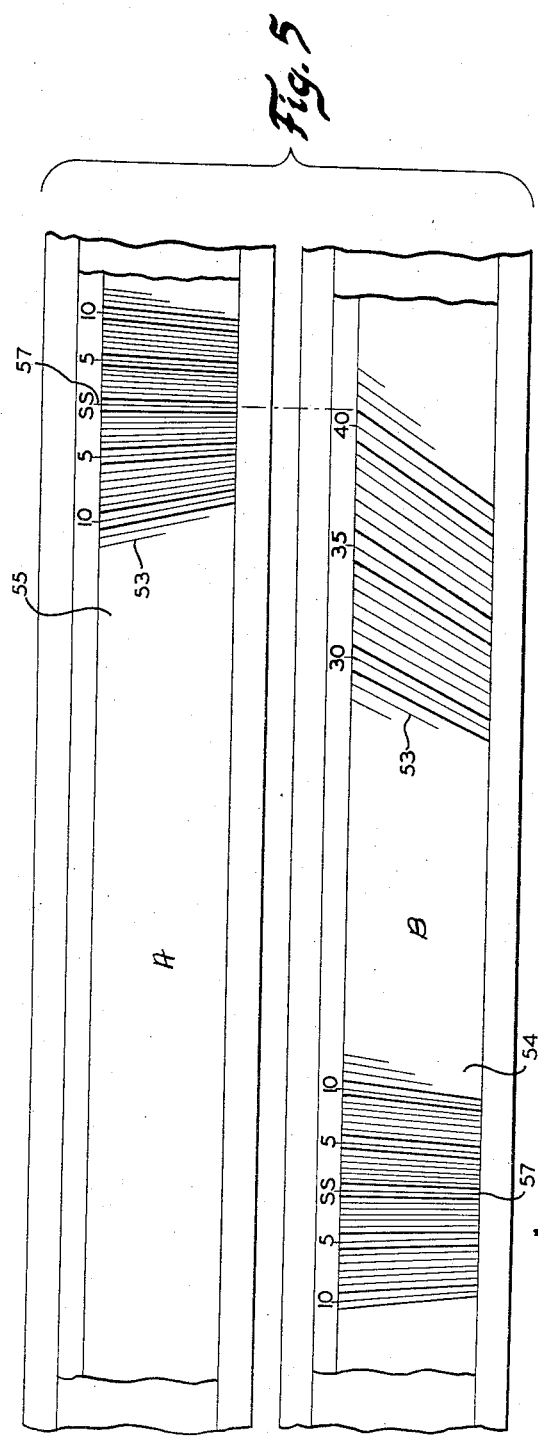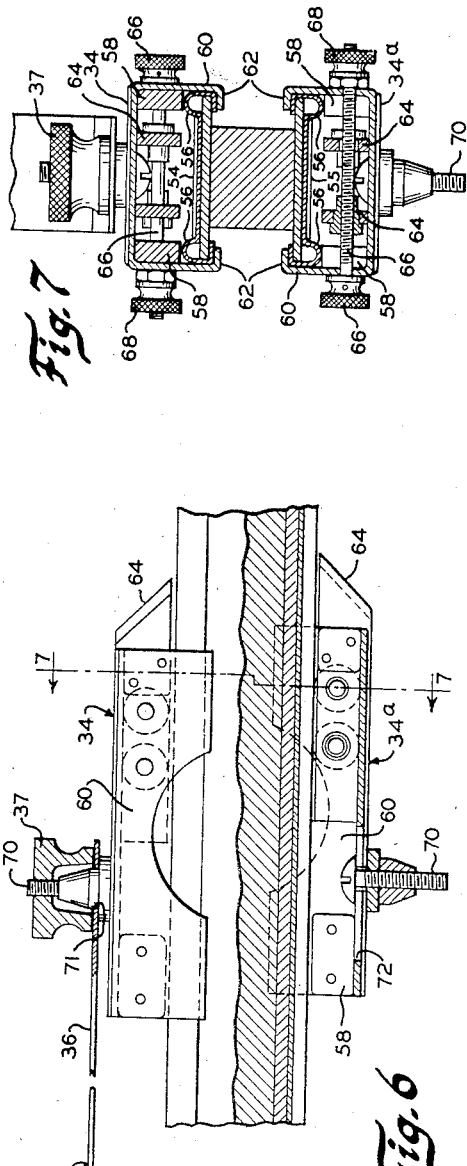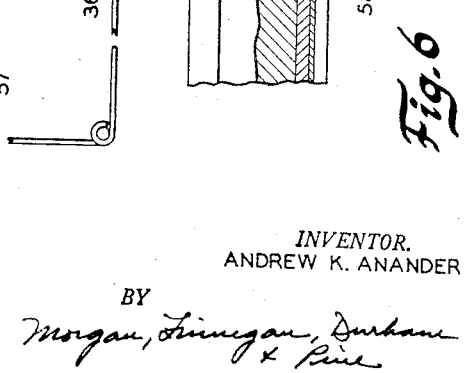

United States Patent Office 2,878,717
Patented Mar. 24, 1959

2,878,717

MULTIPLE SCALE FOR A PHOTOENGRAVING CAMERA

Andrew K. Anander, Glen Cove, N.Y., assignor to Powers Chemco, Inc., Glen Cove, N.Y., a body corporate of New York Application October 23, 1953, Serial No. 387,936

2 Claims. (Cl. 88—24)

The invention relates to photoengraving and photomechanical cameras and more particularly, to an improved scale and certain coacting attachments for use on an enlarging and reducing halftone camera.

An object of the invention is to provide a scale for a photoengraving camera which may be used with lenses of different focal lengths.

Another object of the invention is to construct the scale in such a manner that the change over from one scale to another may be made easily and quickly.

Other objects and advantages of the invention will be set forth in part hereinafter and in part will be obvious herefrom or may be learned by practice with the invention the same being realized by means of the instrumentalities and combinations pointed out in the appended claims.

The invention consists in the novel parts, constructions, arrangements, combinations and improvements herein shown and described.

The invention comprises, in the main, a reducing and enlarging photomechanical or halftone camera together with a movable copy board, both camera and copy board being equipped with indicators which slide upon suitable scales and which measure the distances from the lens to the negative and from the lens to the copy board. The scales are so arranged and adapted as to be rotatable around their longitudinal axes and are provided with two sets of graduations, each set being located on a side opposite to the other. Brackets join the indicators to the copy board and the lens support of the camera and are so constructed that they may be easily and quickly disengaged from one indicator and attached to the other upon rotation of the scale. Viewing means, so constructed as to enable the photographer to read the scales easily and accurately regardless of the angle at which he looks, are also provided upon the copy board and the camera.

The accompanying drawings referred to herein and constituting a part hereof illustrate one embodiment of the invention and together with the description serve to explain the principles of the invention.

Of the drawings:

Figure 1 is a side elevation showing a camera and copy board equipped with scales constructed in accordance with the teachings of the invention, Figure 2 is a vertical section through one of the viewing means provided for the copy board and the camera, Figure 3 is a top, plan view of an indicator, Figure 4 is a plan view of the underside of an indicator, Figure 5 shows a portion of each of the different scales, Figure 6 is a side elevation, partially in section, of an indicator arranged on a rotatable scale and showing a bracket member joined thereto, and Figure 7 is a transverse section through Figure 6 taken along the line 7—7 looking in the direction of the arrows.

Referring first to Figure 1, there is shown a reducing and enlarging photomechanical or half-tone camera 10 together with a copy board 12 for holding a copy of the material to be photographed. The camera is of a well-known type used in this art and is provided with an interchangeable lens 14 mounted on a lens support plate 16 capable of slidable movement in a longitudinal direction. To this end the lens support plate 16 is provided with guide members 18 which slidably engage a pair of rods 20 mounted on the base 22 of the copying apparatus. Because the lens 14 is often extended a great distance from the film holder 15 a supporting frame 24 for the bellows 26 must be located intermediate of the lens 14 and the film holder 15. The copy board 12 is also capable of longitudinal movement and has suitable guide rollers 28 journaled in the base 23 thereof and mounted on the rods 20.

In order to accurately measure the distance from the lens to the negative and from the lens to the copy board a plurality, and preferably two scales 30, 31 are provided for the camera and the copy board. One scale 30 is fixedly positioned with respect to the camera 10, having one end 23 journaled in a bearing 21 on the frame 24 and the opposite end 25 journaled in a bearing 32 mounted on the base 22. This scale measures the distance from the lens to the negative. Accordingly, the scale is provided with an indicator 34 which is capable of slidable motion longitudinally of the scale. The indicator 34 is affixed to the slidable guide member 18 for the camera lens by means of a bracket 36, preferably hinged, and a suitable retaining nut 37. Thus, any movement of the lens produces an equal movement in the indicator with respect to the scale and accurately indicates the distance between the lens and the negative.

In order to enable the photographer to read the scales easily and accurately regardless of the angle at which he looks at the scale there is provided an image plate and image forming lens on the copy board and the camera. Each such image plate and lens comprises a positive lens 41 mounted in an opaque cylindrical barrel 39 having a ground glass screen 40 set at a proper distance from the lens to produce a sharp focus of the scale graduations. A light 42 illuminates the scale. By providing a ground glass viewing plate for the lens image any errors arising from parallax are prevented and the photographer is not required to position the members with his eye directly over the lens.

A similar scale 31 is provided for the copy board, which scale is attached to the sliding guide member 18 so as to be capable of movement, therewith, but which is stationary with respect to the copy board. For this purpose, one end 43 of the scale is journaled in a bearing 44 mounted on a guide member 18 and the opposite end 45 thereof is journaled in a bearing 46 carried by a rod 47 also mounted on the guide member 18. An indicator 48 is slidably mounted on the scale 31 and is affixed to a hinged bracket 50 on the copy board by means of a lock nut 52 in a manner similar to that for the indicator 34 for the camera. Movement of the copy board with respect to the camera lens 14 produces an equal movement of the indicator 48 with respect to the scale 31 and accurately indicates the distance between the lens and the copy board.

To render the scale device capable of use with the camera and copy board when a different lens is placed in the camera the scales 30, 31 are so arranged as to be rotatable about their longitudinal axes. Accordingly, the ends 23, 25, 43, 45 of the scales 30, 31 are journaled in appropriate bearings 21, 32, 44, 46. In accordance with the teachings of the invention each scale is provided with a dual set of graduations 54, 55 (Fig. 5) each set being disposed on a side opposite to that of the other set of graduations. These graduations are constructed in accordance with the teachings of Patent No. 1,755,177 issued to A. Fruwirth, April 22, 1930, and comprise a series of diagonally inclined lines 53. The inclination of the lines varies progressively from that of a reference line 57 intended to indicate the distance at which the size of the photograph will be exactly equal to the size of the copy. This reference line is perpendicular to the edge of the scale. All other indicating lines 53 are inclined to a degree proportional to their distance from the reference line 57. Thus the farther the indicating line is from line 57 the greater will be its angle of inclination. These indicating lines 53 are marked to indicate the percentage reduction or enlargement in the size of the negative obtained at those settings over the copy and the inclinations are designed to compensate for slight errors in the focal length. Figure 5 shows a portion of the scales utilized when lens A has a focal length of 19 inches and lens B has a focal length of 14 inches.

Each scale is provided with a pair of indicators 34, 34a, 48, 48a, one for each set of graduations. Rotation of the scale brings the second indicator into alignment with the brackets 36, 50 on the lens support plate of the camera and the copy board. The indicators are constructed so as to slidably engage a pair of raised portions 56 on the scale graduations 54, 55 and for this purpose have a pair of runners 58 joined to each indicator body 60. The indicator body has its terminal end portions 62 shaped to engage the under side of the scale graduations 54, 55 but the tolerance is sufficient to permit slidable movement along the scae graduation. A pair of pointers 64, to indicate scale settings for enlargement and reduction, are also provided for the indicator and are adjustably secured to the indicator body 60 by means of the threaded screw 66 and adjusting nut 68 journaled in the side portions of the indicator body. Rotation of the adjusting screw moves the pointers transversely of the indicator. This adjustment, together with scale graduations, as taught in the Fruwirth patent mentioned above, corrects the error in the scale reading resulting from any inaccuracies in the focal length of the camera lens.

Each indicator is also provided with a stud 70 which extends in the vertical direction from the indicator body 60 and which is designed to engage a cooperating opening 71 in the bracket 36, 50 on the copy board 12 and the camera guide member 18. When the nut 37, 52 is tightened down on this stud 70 the bracket 36, 50 is rigidly joined to the indicator and moves the indicator in accordance with the movement of the camera lens or the copy board. A longitudinal slot 72 for the stud 70 is provided in the indicator body 60 to effect a further adjustment for constructional errors in the camera and in scale mounting. By changing the position of the stud 70 with respect to the slot 72 the pointers 64 may be moved longitudinally of the scales 30, 31.

The operation of the device is as follows: the camera 10 is first focused to the same size as the copy on the copy board by adjusting the copy board until the image in the camera is exactly the same size. The scales 30, 31 are then clamped in place. After this has been done the lens support plate 16 and the copy board 12 are positioned so as to focus for a 50% reduction for both sets of pointers 64. With the copy board fixed the lens support plate 16 is moved to a position where the size of the image is doubled and the appropriate pointer 64 is moved to coincide with the line 50 on the scale 30.

This procedure is repeated for several different settings until the indicators have been satisfactorily adjusted for all points on the scale. The scales and indicators are now ready to indicate the proper settings for the lens support plate for any desired amount of reduction or enlargement.

The amount of reduction or enlargement of the copy is first determined and after this has been determined the relative positions of the copy board 12 and the lens 14 and the film holder 15 may be computed. These values are then located on the scales 30, 31 and the indicators 34, 48 for the camera guide member 18 and the copy board 12 are moved until they correspond to the same. The copy may then be photographed and the image on the negative will be exactly in focus and will be of the proper size. When it is desired to use another lens in the camera having a different focal length the lock nuts 37, 52 on the indicators 34, 48 are removed, the hinged brackets 36, 50 are swung upwardly to disengage the studs 70 and the scales 30, 31 are then rotated so as to bring the second indicators 34a, 48a into alignment with brackets 36, 50 on the copy board and camera guide member. The brackets are then swung downwardly over the studs 70, the lock nuts 37, 52 tightened and the apparatus is ready to be used with a new lens.

The scales 30, 31 are carefully mounted so that each rotates about an axis which is equidistant from the different sets of graduations 54, 55. This assures proper focus of the scale image upon the ground glass 40 and does away with the necessity of refocusing the scale image each time the scales are rotated.

The invention in its broader aspects is not limited to the specific mechanisms shown and described but departures may be made therefrom within the scope of the accompanying claims without departing from the principles of the invention and without sacrificing its chief advantages.

I claim:

1. A scale mechanism for a photoengraving camera comprising in combination a camera having a lens supporting member movable relatively to a film supporting member, a movable copy board for the camera, a scale connected to one of said camera members and extending towards the other member, a second scale connected to the lens supporting member and extending towards the copy board, said scales being rotatable and having a plurality of different sets of graduations thereon, indicators carried by said scales and cooperating with said graduations to indicate focal positions of the lens and the copy board, and means connecting said indicators with the said other member and the copy board for relatively moving the indicators as one camera member and the copy board are moved relatively to each other.

2. A scale mechanism as set forth in claim 1 wherein the separate indicators are separately engageable with the connecting means.

References Cited in the file of this patent

UNITED STATES PATENTS

| | | |
|---|---|---|
| 1,401,902 | Fruwirth | Dec. 27, 1921 |
| 1,755,177 | Fruwirth | Apr. 22, 1930 |
| 2,394,820 | Syrcher | Feb. 12, 1946 |
| 2,638,824 | Freund | May 19, 1953 |